United States Patent [19]

Thomas et al.

[11] Patent Number: 5,507,405
[45] Date of Patent: Apr. 16, 1996

[54] THERMALLY INSULATED CARGO CONTAINER

[75] Inventors: Michael I. Thomas; Charles R. Fetz; Daniel J. McCormack, all of Savannah, Ga.

[73] Assignee: Great Dane Trailers, Inc., Savannah, Ga.

[21] Appl. No.: 168,678

[22] Filed: Dec. 16, 1993

[51] Int. Cl.$^6$ .................................................. B62D 33/04
[52] U.S. Cl. ..................... 220/1.5; 296/191; 296/190; 296/181; 220/4.28; 220/421; 220/444
[58] Field of Search ................................. 296/181, 183, 296/191, 901; 220/1.5, 421, 420, 444, 902, 468, 469, 692, 4.28, DIG. 24, DIG. 14, 452

[56] References Cited

U.S. PATENT DOCUMENTS

| | | | |
|---|---|---|---|
| 2,869,336 | 1/1959 | Smidl et al. | 220/902 |
| 3,003,810 | 10/1961 | Kloofe et al. | 220/902 |
| 3,115,982 | 12/1963 | Morrison | 220/902 |
| 3,393,920 | 7/1968 | Ehrlich | 296/181 |
| 3,854,620 | 12/1974 | Saidla | 220/1.5 |
| 4,351,558 | 9/1982 | Mueller | 296/901 |
| 4,531,278 | 7/1985 | Boykin | 296/183 |
| 4,685,721 | 8/1987 | Banerjea | 296/181 |
| 4,707,401 | 11/1987 | Benford | 220/902 |
| 4,940,279 | 7/1990 | Abbott et al. | 296/181 |
| 5,112,099 | 5/1992 | Yurgevich et al. | 296/191 |

OTHER PUBLICATIONS

Stoughton Midel ASDCW Catalog date approx. 1989, 2 pages.
Stoughton Catalog (Domestic Container and 3" Gooseneck Chassis, approx. date mid 1992, 2 pages (Double sided).
Monon Chassis Specifications and drawings, 5 Sheets.

Primary Examiner—Stephen J. Castellano
Attorney, Agent, or Firm—William Squire

[57] ABSTRACT

A relatively thin side wall panel is formed of an array of sheet metal riveted sections formed from an aluminum coil to form inner and outer panel skins which are placed in a mold and used to form with the skins an injected thermoset plastic rigid foam core panel which is 48 foot by 9 foot and is about 0.9 inches thick. The panel is cut into three side panels for each container side. The roof is also formed similarly into a single panel of about 1.1 inches thick with an array of recesses which reinforce the roof panels and allow for thermal expression, the recesses containing the rivets of the adjoining skin sections. The panel is then cut to form three roof panels. A frame is formed of lower and upper extruded aluminum rails and lower steel rails at the front and rear, front and rear corner posts and two pairs of intermediate posts to which posts and rails the side panels are attached. The posts are interconnected to headers to which with the upper rails the roof panels are attached. A front wall containing fiberglass insulation between an outer metal skin and an inner plywood layer is secured to the front posts and a lower sill and upper header. The entire container weighs no more than a conventional all metal container without the heavier foam core panels and structurally resists bowing at the lower side rails.

25 Claims, 12 Drawing Sheets

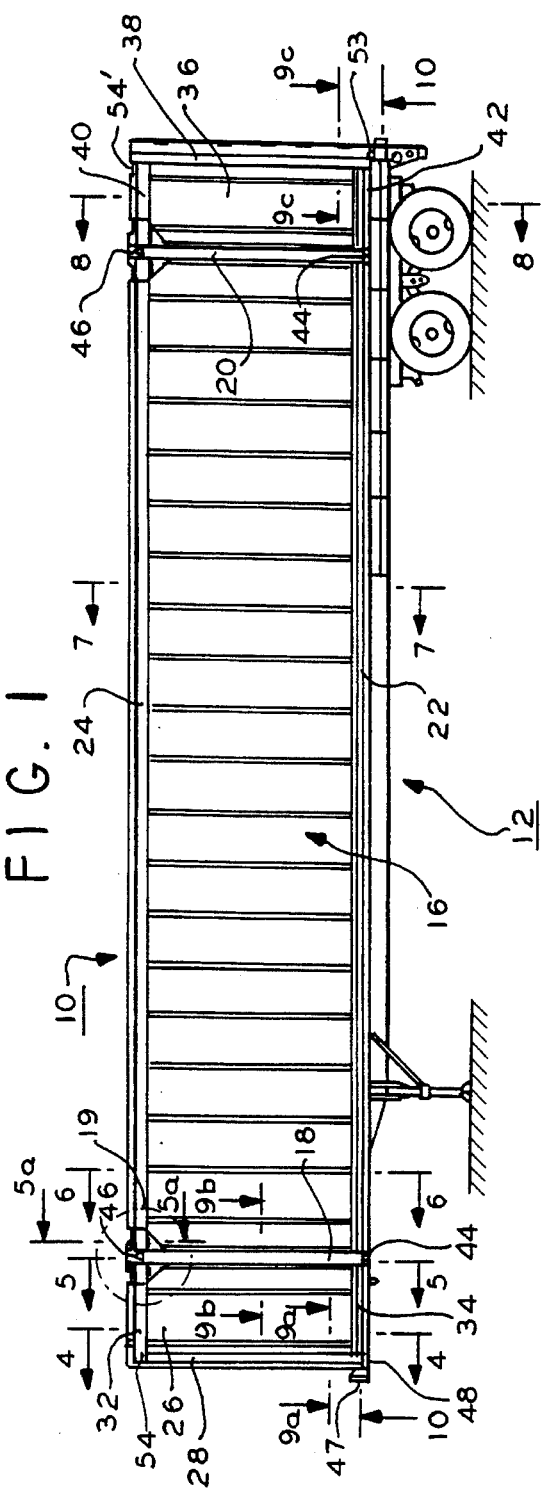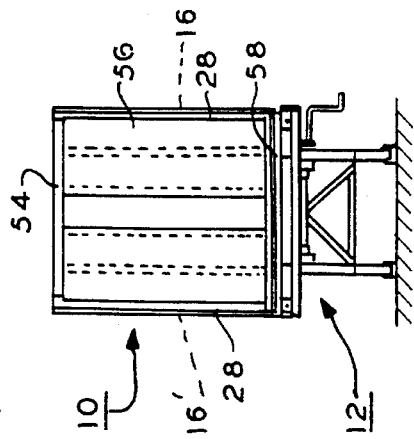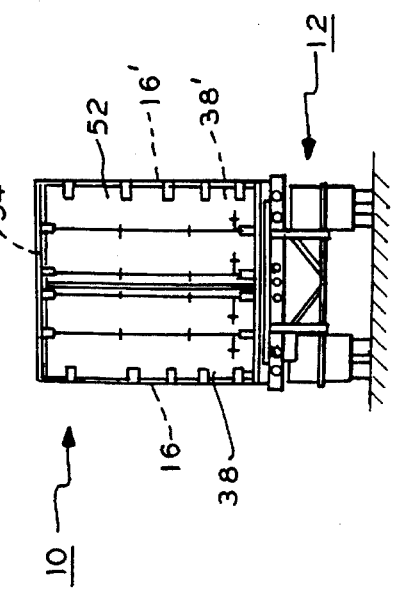

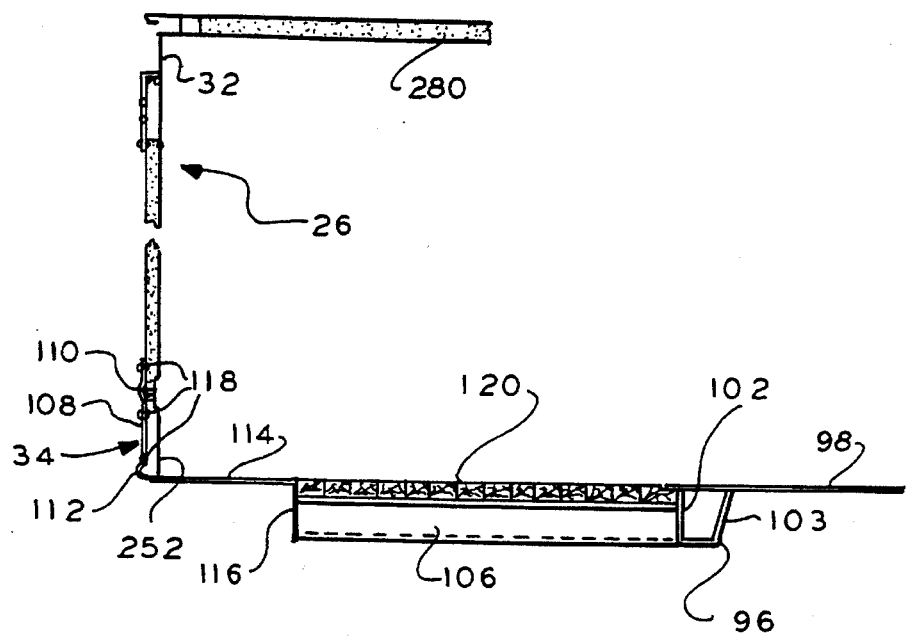
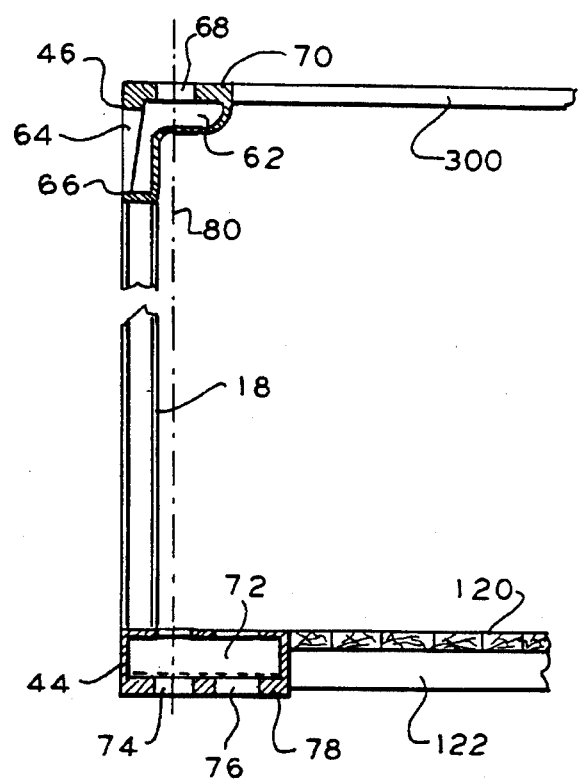
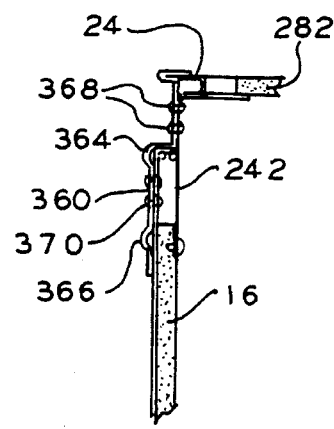

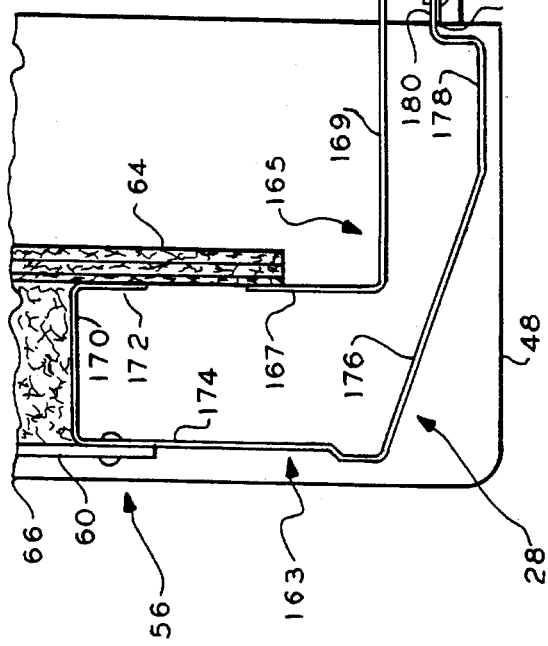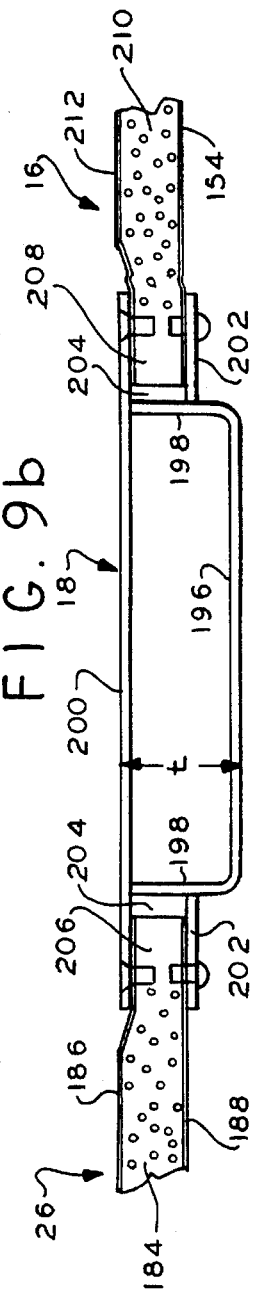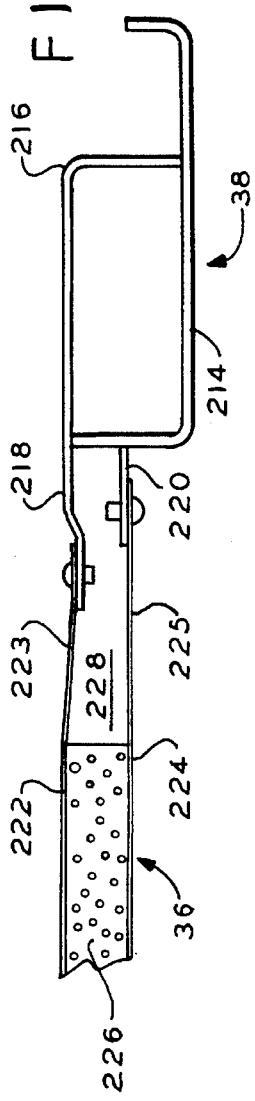

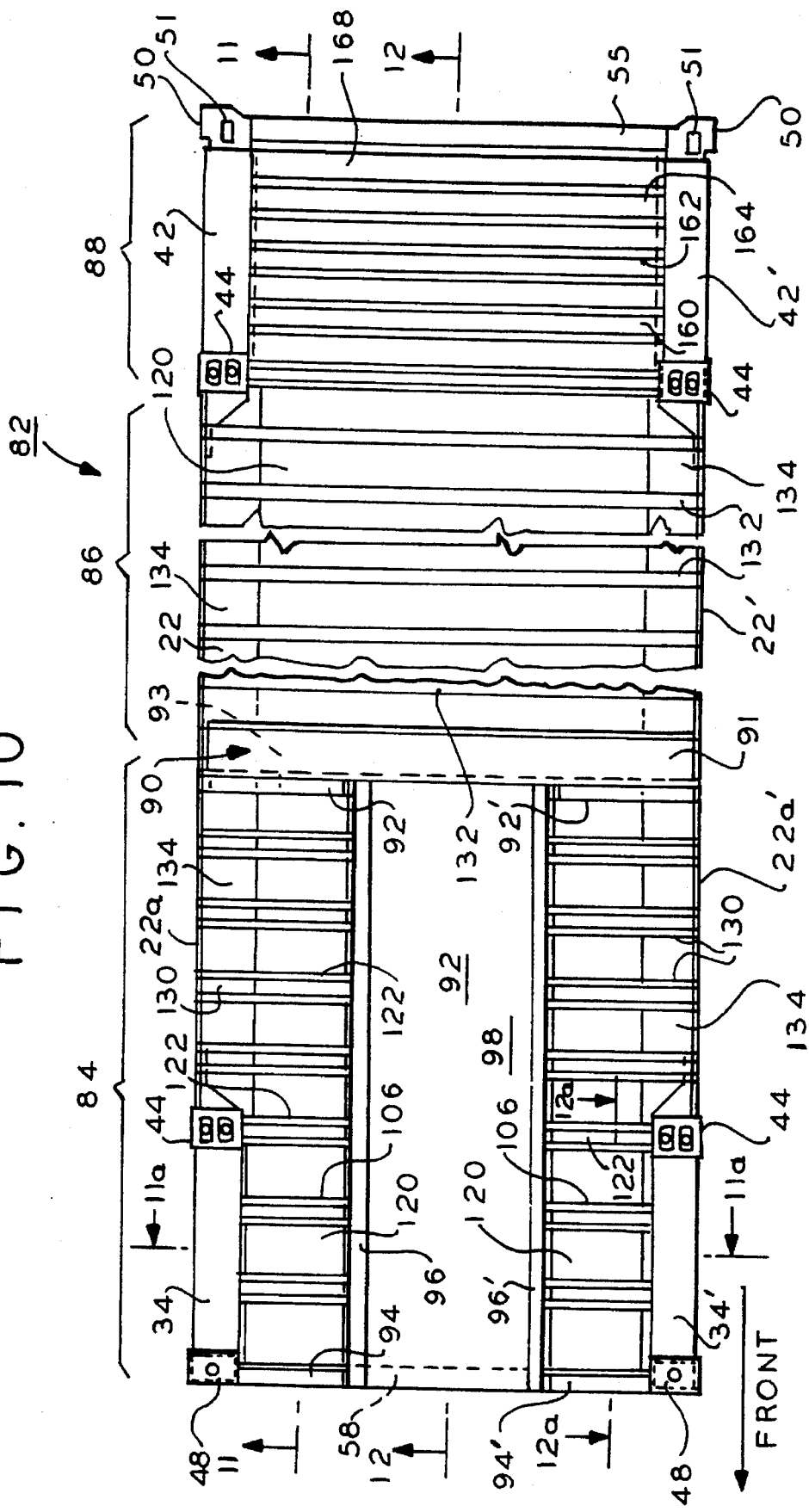

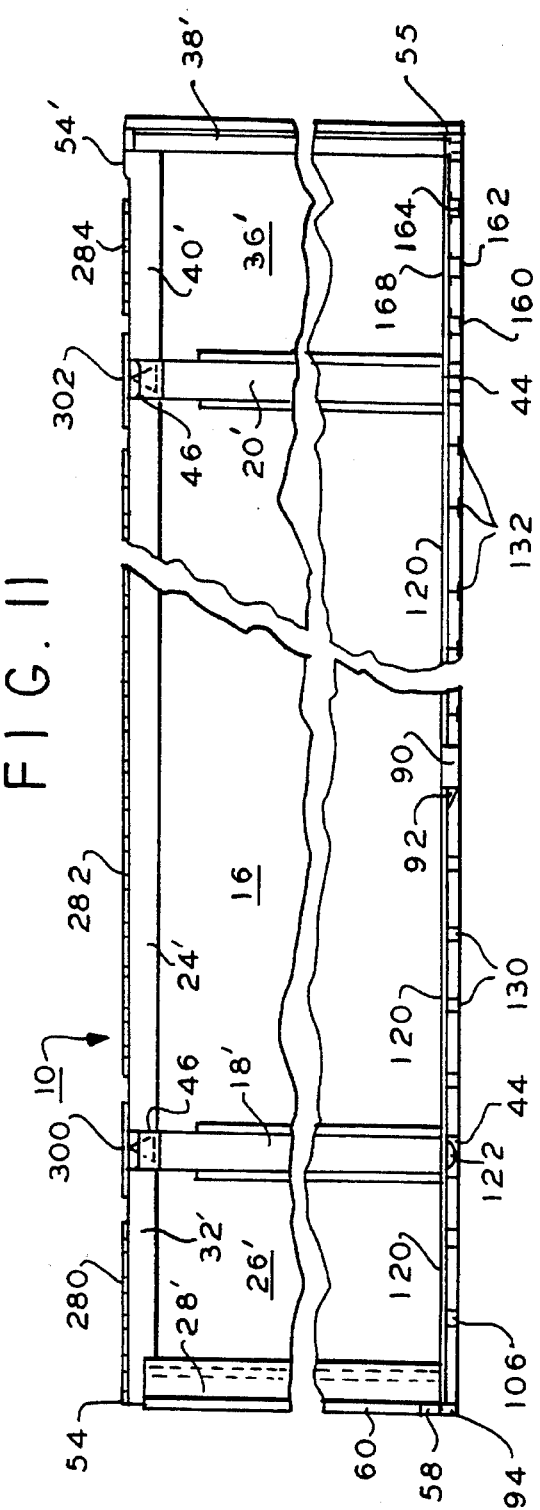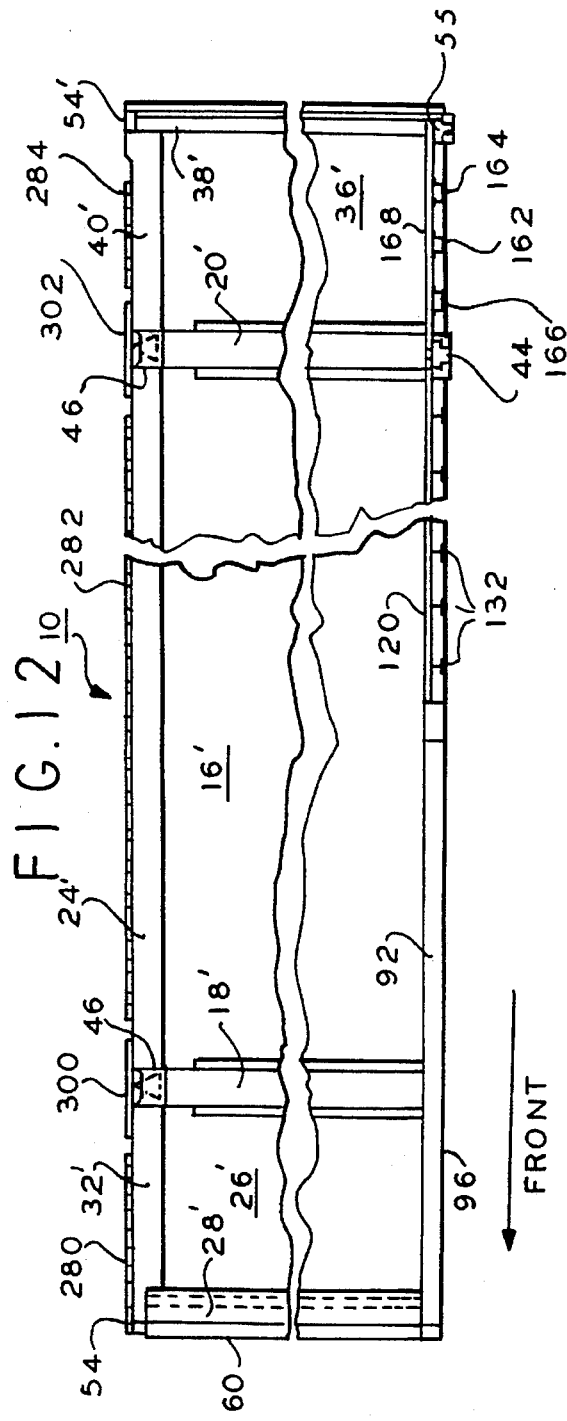

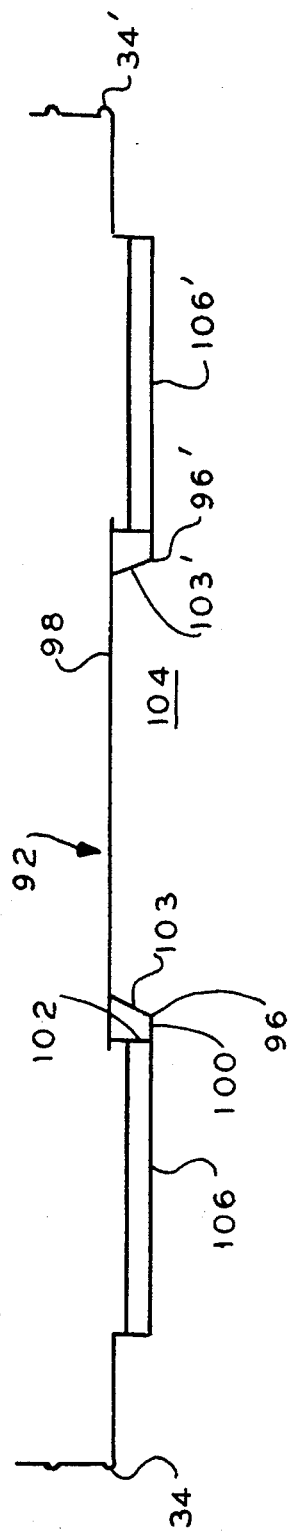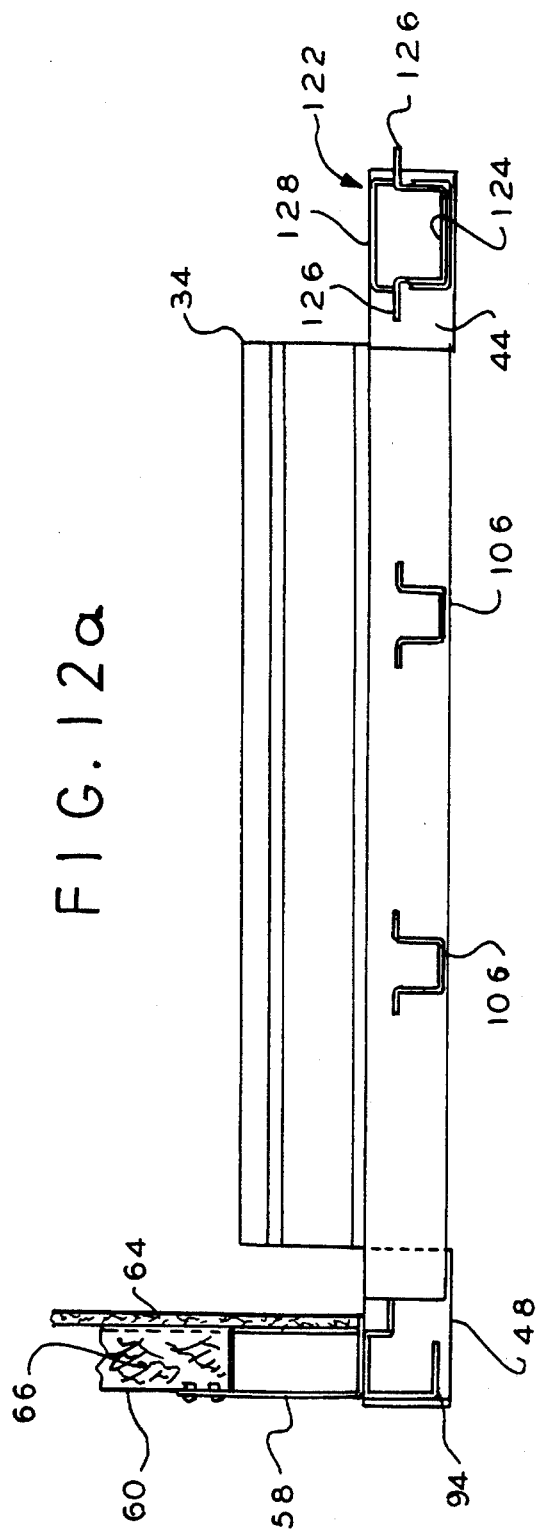

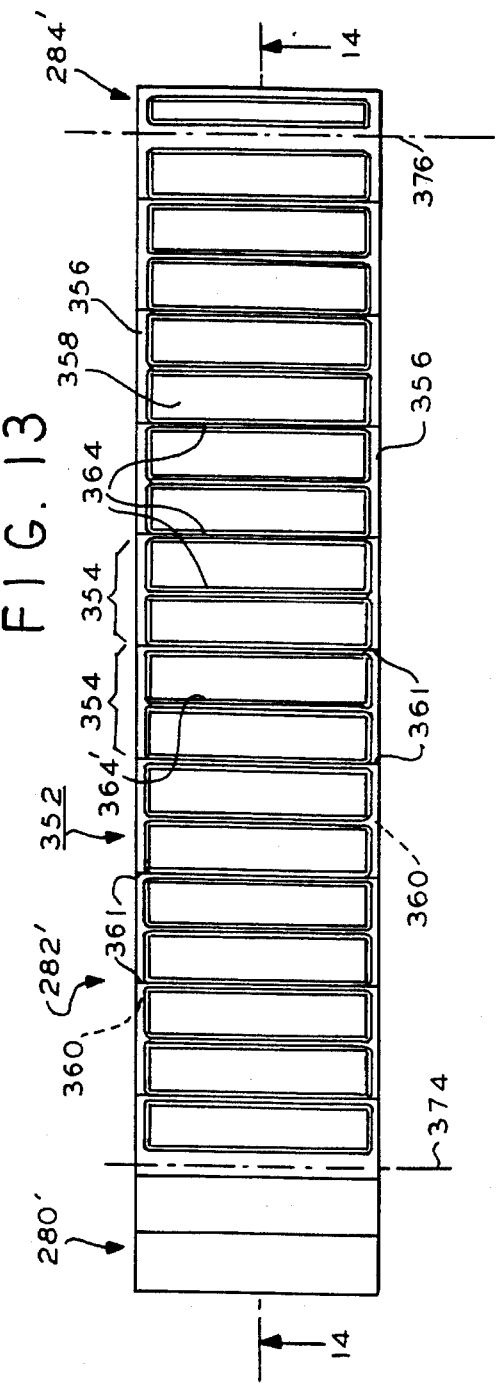
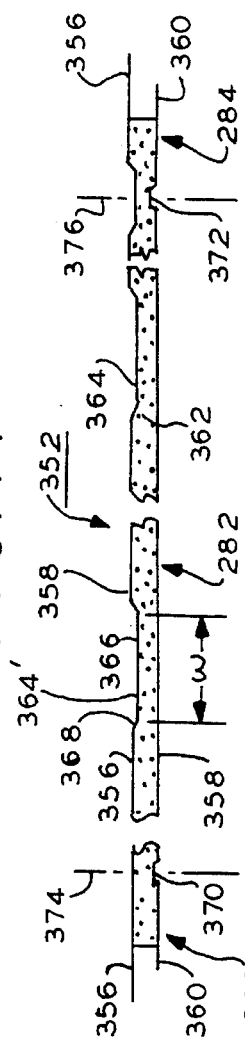
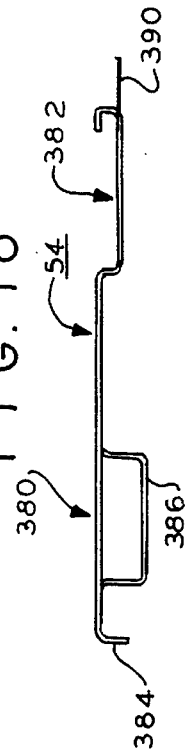
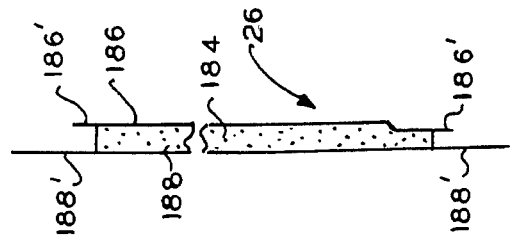

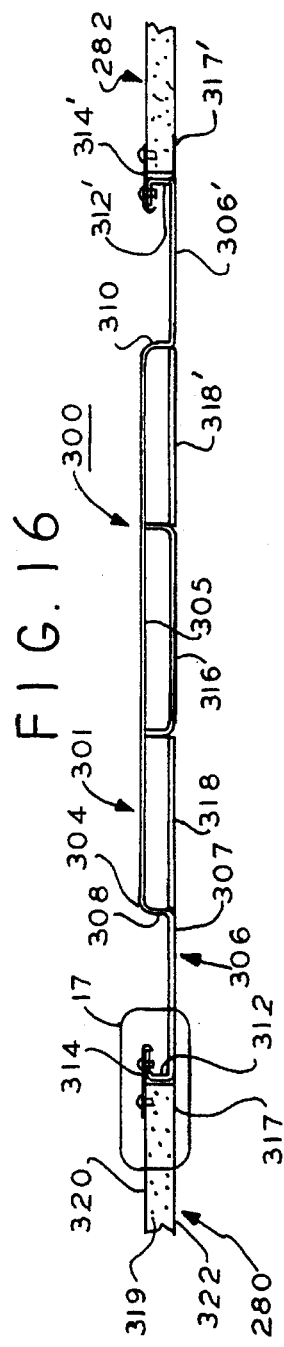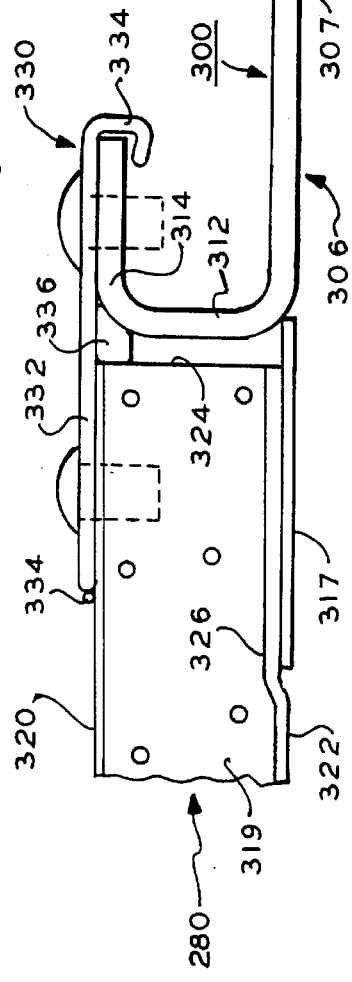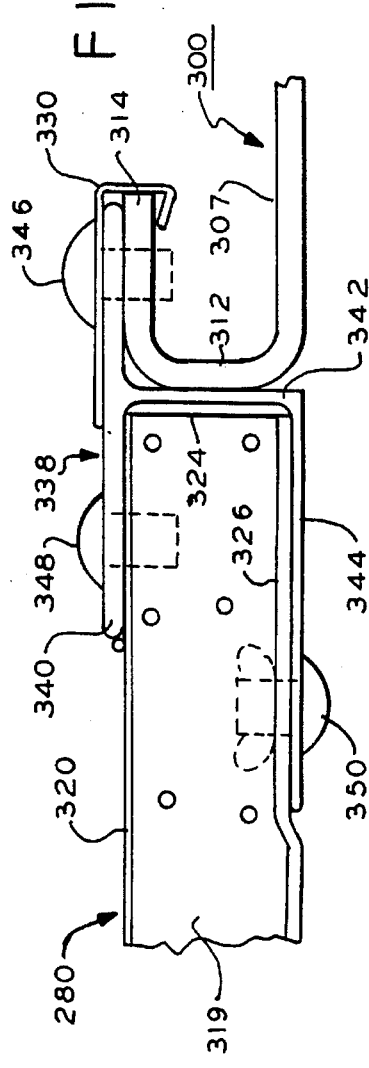

THERMALLY INSULATED CARGO CONTAINER

This invention relates to cargo containers of the type that are carried by truck chassis over the road and by rail cars, and more particularly, to thermally insulated containers.

Of interest is commonly owned United States copending application Ser. No. 08/055,150 entitled Lightweight Container-Chassis Construction filed Apr. 29, 1993 in the name of the present inventors.

Disclosed in the aforementioned copending application is a container construction for use with a lightweight chassis and rail cars. The containers described therein include both insulated and uninsulated types adapted for particular use with the disclosed chassis. The present invention relates to an improved thermally insulated container that could be used similarly as the insulated container disclosed in the aforementioned application.

Insulated containers have been widely used. Primarily these containers are for use on truck chassis, rail cars and ships. In rail cars the containers may be stacked in twos whereas in ships the containers may be stacked 9 high. The latter containers are relatively strong and heavy. Because of restriction for over the road weights imposed by various jurisdictions, ship type containers are not generally satisfactory for over the road use. A relatively lighter container is needed which can contain higher cargo weights for a given container weight.

Typically, for example, truck trailers can have a gross weight of about 80,000 pounds comprising 17,000 pounds for the tractor and 15,000 pounds for the chassis and container leaving about 48,000 pounds for cargo. Present rail and truck cargo containers, however, for 48 foot lengths, for example, require intermediate posts and headers as well as steel castings for stacking purposes on rail cars and for lifting, which posts, headers and castings are not needed in trailers. These are referred to as double end frame containers in that there is a central wall section and front and rear wall sections on the container sides. An all metal 48 foot container including intermediate posts and castings weighs about 8,900 pounds.

Prior art insulated containers have refrigeration systems connected thereto. These containers have relatively thick insulated walls, for example, 2–4 inches thick wherein the intermediate posts are buried in the insulation and there is no metal to metal heat transfer paths from the container interior to the exterior. These containers are relatively heavy compared to all metal containers since the insulation comprises rigid thermoset foam cores which adds considerably to the container weight.

Prior art refrigerated containers are not particularly useful where it is desired to provide a thermally insulated container which is not for use with refrigeration units. This is because a need is present for insulated containers for paints and foodstuffs and other perishables which may not need refrigeration, but which need to be protected from periodic relatively high ambient temperature fluctuations. For example, a 40,000 pound cargo of paint has a relatively high latent heat mass. Exposure of the container to wide external ambient temperature fluctuations does not result in wide temperature fluctuations of the cargo where the container is substantially insulated even though there may be metal to metal heat paths between the container interior and exterior. There is a need for thermally insulated containers which are not as well insulated as refrigerated containers.

A persistent problem is that prior insulated containers are fabricated with the prior art technology employing the thicker insulation walls of refrigerated units, or they may be of conventional uninsulated construction and then insulated, and thus, are heavy and thermally inefficient. These thicker walls add considerably to the container weight. There is a need for containers which weigh as little as possible to maximize cargo weight capacity. Prior rigid thermosetting foam cores are fabricated for these thicker walls. Typical 48 foot containers have central panels 40 feet long by 9 foot heights. To fabricate a foam core of these dimensions requires the liquid foam to fill the cavity between the panel skins without voids, cracks and similar defects. Prior art technology is such it was not considered practical or possible to fabricate such large foam cores of about 1.5 inches thick or thinner without creating substantial undesired defects in the foam.

The present inventors recognize a need to provide a thermally insulated container which weighs about the same as an all metal container and still provide structural integrity to the container for use on over the road chassis and rail cars. The problem with achieving this goal is that while containers have intermediate stacking posts, the containers still have to absorb shear and transverse bending loads between the posts. The bending loads are caused by the cargo near the floor area which may shift against the container sides, bowing the sides outwardly. This is not desirable in rail cars where the wells receiving the containers are of limited transverse dimensions. The bowing action causes premature failure of the container walls and unsightly progressively increasing external container damage. Thus it is not seen practical in the prior art to make thin insulated walls because of the structural strength requirements of containers. Also, prior art containers are made with continuous homogeneous skins along the side wall lengths which are difficult to repair.

A composite panel for thermally insulating a cargo container according to the present invention comprises a planar first sheet skin layer, a planar second sheet skin layer spaced from and substantially parallel to the first layer and a thermoset foam core thermally insulating layer secured to and between the first and second skin layers, the first, second and insulting layers having a combined thickness of at most about 1.5 inches and a broad surface region of at least about 135 square feet.

In accordance with an embodiment, the first and second skin layers are aluminum sheets of 0.040 to 0.063 inches thick and the core layer is in the range of 0.750 to 1.40 inches thick.

In accordance with a further embodiment, the skin layers each comprise a plurality of rectangular sections having a length and width, the sections being attached to one another at a length edge thereto.

In accordance with a further embodiment, a thermally insulated cargo container comprises a floor, a roof overlying the floor, a plurality of side walls secured to the roof and floor and forming a cargo receiving space therebetween, one of the walls forming a front wall and a pair of said walls forming opposing sides of the container, each of the opposing sides and roof comprising a first sheet metal skin layer, a second sheet skin layer spaced from and substantially parallel to the first layer and a thermoset foam core thermally insulating layer secured to and between the first and second skin layers, the first, second and insulating layers having a combined thickness of at most about 1.5 inches and a broad surface region of at least about 15 feet in length by about 9 feet in width.

A method of forming a cargo container thermally insulating wall of a given length according to the present invention comprises forming first and second skin layers, injecting a thermosetting foam material between the skin layers to adheringly attach the foam to the skin layers and curing the foam to form a panel with the skin layers comprising a rigid foam core layer having a density in the range of 4 to 9 pounds per cubic foot, the cured foam core and skin layers having combined thickness in the range of 0.750 to 1.50 inches.

BRIEF DESCRIPTION OF THE DRAWING

FIG. 1 is a side elevation view of a container according to an embodiment of the present invention, the container being attached to a chassis for transport over a highway;

FIGS. 2 and 3 are respective rear and front elevation views of the container and chassis of FIG. 1;

FIG. 3b is a sectional view taken along lines 3b—3b of FIG. 3a;

FIG. 4 is a sectional elevation view of the container of FIG. 1 taken along lines 4—4;

FIG. 5 is a sectional elevation view of the container of FIG. 1 taken along lines 5—5;

FIG. 5a is a sectional elevation view of the container of FIG. 1 taken along lines 5a—5a;

FIG. 7a is a sectional elevation view of the container of FIG. 7 taken at region 7a;

FIG. 8a is a sectional elevation view of the container of FIG. 8 taken at region 8a;

FIGS. 9a, 9b and 9c are sectional plan views of the container of FIG. 1 taken along respective lines 9a—9a, 9b—9b and 9c—9c;

FIG. 10 is a sectional plan view of the floor of the container of FIG. 8 taken along lines 10—10;

FIGS. 11 and 12 are respective side elevation sectional views of the container of FIG. 10 taken along respective lines 11—11 and 12—12;

FIGS. 11a and 12a are respective elevation sectional views of fragmented portions of the container of FIG. 10 taken along respective lines 11a—11a and 12a—12a;

FIG. 13 is a plan view of a composite roof panel for the container of FIG. 1 prior to severing the panel into separate panels and attaching the panels to the container frame;

FIG. 14 is a side elevation fragmented view of the panel of FIG. 13 taken along lines 14—14;

FIG. 15 is an elevation sectional view of a composite side panel used in the embodiments of FIGS. 6–8;

FIG. 16 is a side elevation view of the roof panels of FIG. 13 secured to a representative intermediate header;

FIG. 17 is a more detailed view of the structure of FIG. 16 taken at region 17;

FIG. 17a is an alternative embodiment of the structure of FIG. 17;

FIG. 18 is an end elevation view of a rear frame header; and

In FIGS. 1, 2 and 3, a thermally insulated container 10 according to one embodiment of the present invention is shown attached to a chassis 12 of the type hauled over highways by a tractor (not shown). The chassis may be of conventional design does not form any part of the present invention. However, the chassis may also be of the construction disclosed in the aforementioned copending application. The container 10 in this instance would be modified also as disclosed in that copending application. In the drawing, identical parts are identified throughout with the same reference numerals.

Figure 3A:
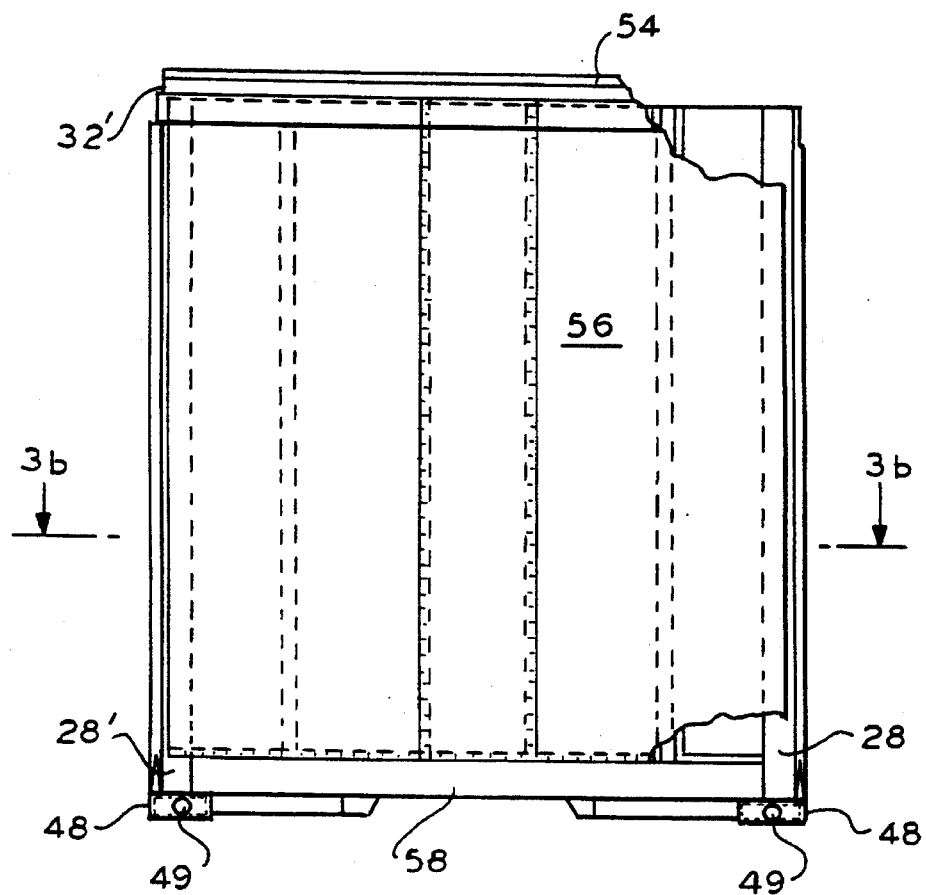
FIG. 3a is a more detailed front elevation view partially in section of the container of FIG. 1.

Container 10 is shown as one comprising a 48 foot length but may also be of shorter lengths, for example, 15 foot length. The container 12 may be stacked one over the other in rail cars as disclosed in the aforementioned copending application. The containers may also be placed directly on a ground surface.

The container 12 comprises a major central side panel 16 connected between a front intermediate post 18 and a rear intermediate post 20, a lower, preferably aluminum, horizontal intermediate rail 22 and an upper, preferably aluminum, horizontal intermediate rail 24. The container central side panel including posts and rails on the opposite container side is a mirror image. The intermediate posts are preferably steel.

A front side end panel 26 is connected between a front corner post 28, intermediate post 18 and horizontal upper rail 32 and lower front steel rail 34. Rear side and panel 36 is connected between rear intermediate post 20, rear corner post 38, upper rail 40 and lower steel rail 42. The opposite side of the container 10 is a mirror image of this just described structure. Therefore, a detailed description of one side is representative.

Beneath each intermediate post 18 and 20 is a steel casting 44 welded to that post. On top of and welded to each post 18 and 20 is a further steel casting 46. Beneath and welded to the front corner post is a steel fabricated fitment 48 having a forward aperture 49 (FIG. 3a) for attachment to the chassis front bolster 47 (FIG. 1) and beneath and welded to the rear corner post is a fitment 50 (FIG. 10). Fitment 50 is a steel plate with an aperture 50a, as best seen in FIG. 10 which better illustrates the position of the lower castings and fitments on each side of the container. Aperture 50a receives a twistlock 53 on the chassis 12 (FIG. 1).

In FIG. 2, rear door assembly 52 is connected between rear corner posts 38 and 38' (the primed reference numerals refer to mirror image structures identified with the same reference unprimed numeral). Assembly 52 is also connected to rear header 54 shown in more detail in FIG. 18 and sill 55 (FIG. 10) which is part of the rear floor assembly to be described. Door assembly 52 is conventional and will not be described in further detail.

Figure 3B:
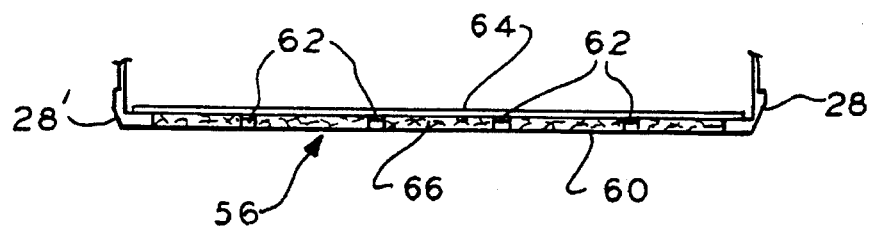

In FIGS. 3 and 3a, front wall assembly 56 is connected to and between corner posts 28 and 28', front header 51 and upper sill 58. Sill 58 is connected between posts 28 and 28'. In FIG. 3b, front wall assembly 56 comprises outer sheet metal skin 60 and an array of vertical ribs 62 secured to skin 60, e.g., via one piece nylon nail-like serrated fasteners. A plywood inner liner 64 is secured to posts 28 and 28' and ribs 62, e.g., rivets. The space between the skin 60 and liner 64 is filled with fiberglass insulation 66.

In FIG. 5, representative upper casting 46 comprises an L-shaped member having a hollow L-shaped core 62, a front triangular aperture 64 in depending leg 66 and an aperture 68 in horizontal leg 70. The bottom casting 44 is a rectangular volume with a hollow core 72 and has a pair of spaced apertures 74 and 76 in bottom wall 78. Apertures 74 and 68 are aligned on axis 80. An upper container has its weight concentrated at axis 80 on casting 46 which is aligned on aperture 74 to provide minimum bending torque to the post 18 by minimizing the distance of axis 80 from the post 18 of a lower container. The aperture 76 is used to mount the casting 44 to a mating support in a rail car well or when stacked over a prior art container.

In FIG. 10, floor assembly 82 comprises a tunnel section 84 at the forward end of the container, a central section 86 and a rear section 88. The tunnel section 84 includes a transverse bolster beam 90 which comprises an inverted U-shaped channel member 91 whose leg edges are welded to a plate 93 to form a rectangular tube extending between the container sides. The bolster beam 90 at its ends is connected to rail 22 at one container side and to rail 22' at the other container side. A horizontal plate 89 is secured between rail 22 and the tunnel 92 normal to a side of a leg of the channel member 91 at the end of tunnel 92. At the front, lower sills 94 and 94' are connected between the tunnel 92 and a fabricated metal fitment 48.

In FIG. 11*a*, tunnel 92 comprises two mirror image channel members 96, 96' and a plate 98. Member 96 has a base wall 100 and two upstanding side walls 102 and 103. Wall 102 is normal to plate 98 and wall 100 while wall 103 is inclined at an angle to plate 98 and wall 100 to form a trapezoidal tunnel space 104 between walls 103, 103' and plate 98. Space 104 runs for the length of the tunnel 92. The inclination of walls 103 and 103' is such to provide a close wedging action with the mating gooseneck (not shown) of the chassis 12. The plate 98 rests on the gooseneck of the chassis. A plurality of hat shaped beams 106 are welded between lower front rail 34 and wall 102 of beam 96. Similar beams 106' are on the other side of the tunnel.

In FIG. 4, front lower rail 34 comprises a vertical leg 108 with two parallel spaced ridges 110 and 112. A horizontal leg 114 extends from ridge 112 and at its end edge is formed into a vertically downward depending leg 116, the entire rail being formed of sheet steel. The ridges 110 and 112 protect rivets 118 which attach the outer skin of wall 26 to leg 108. Beam 106 is welded to leg 116 at one beam end and to wall 102 at its other end. A hardwood deck 120 is secured over beams 106 with leg 114, deck 120 and plate 98 forming a continuous floor surface. The forward end of deck 120 terminates at upper sill 58, FIG. 10. Rail 34 is welded to front fitment 48 and casting 44. The other side of the floor is a mirror image.

Figure 8:
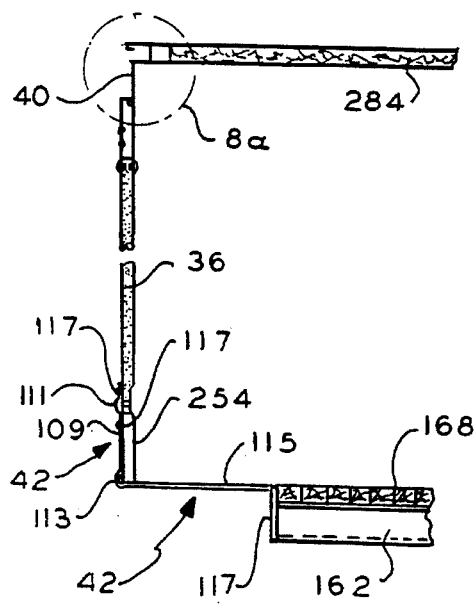
FIG. 8 is a sectional elevation view of the container of FIG. 1 taken along lines 8—8.

In FIG. 8, rear lower rail 42 is similar to front rail 34. Lower rear rail 42 comprises a vertical leg 109 with two parallel spaced ridges 111 and 113. A horizontal leg 115 extends from ridge 113 and at its end edge is formed into a vertically downward depending leg 117, the rail being formed of sheet steel. The ridges 111 and 113 protect rivets 117 which attach the outer skin of wall 36 to leg 109. Beam 162 is welded to leg 117 at one beam end and to a corresponding leg of the opposite side lower rear rail 42' at its other end. Hardwood deck 168 is secured over beams 160–164 (FIG. 10) with leg 115 and deck 168 forming a continuous sloping floor surface. The rear end of deck 168 terminates at sill 55, FIG. 10. Rail 42 is welded to rear sill 55 with fitment 50 welded to and below the sill on each side.

A beam 122, FIGS. 10 and 12*a*, is welded between casting 44 and channel member 96 wall 102. In FIG. 12*a* beam 122 comprises a hat shaped member 124 having a pair of flanges 126 to which a U-shaped channel 128 is welded. A second beam 122, FIG. 10, is welded between tunnel 92 channel member 96' and a second casting 44 on the other side of the container. An array of parallel beams 130, FIG. 10, are riveted to and between rail 22 at one beam end and welded to channel member 96 at the other beam end between beam 122 and bolster 90. Beams 130 are the same cross section as beams 122 but longer. FIG. 11 shows the general arrangement of these beams.

Figure 7:
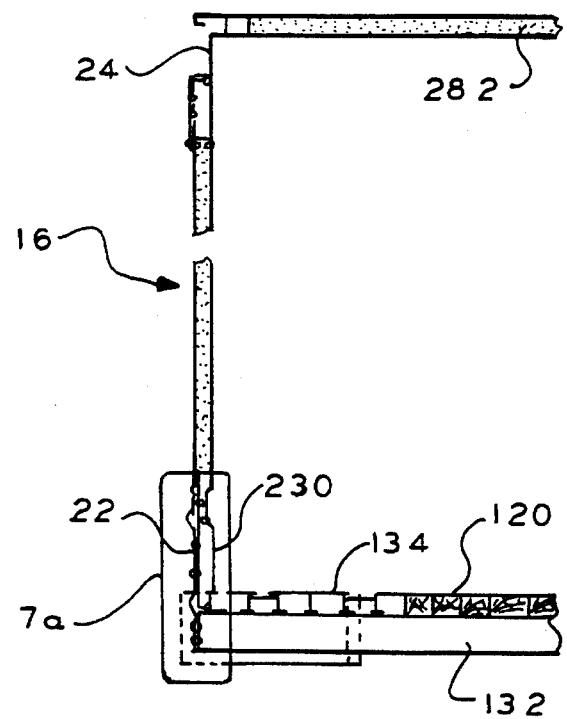
FIG. 7 is a sectional elevation view of the container of FIG. 1 taken along lines 7—7.

In FIG. 10, section 86 comprises an array of parallel I beams 132 riveted to and between side lower rails 22 and 22'. Beams 132 are arranged as shown in FIGS. 11 and 12. In FIG. 7, hardwood deck 120 is supported by beams 132. An extruded semi-hollow aluminum deck section 134 is between deck 120 and rail 22 on each side of the container floor over beams 132.

Figure 7A:
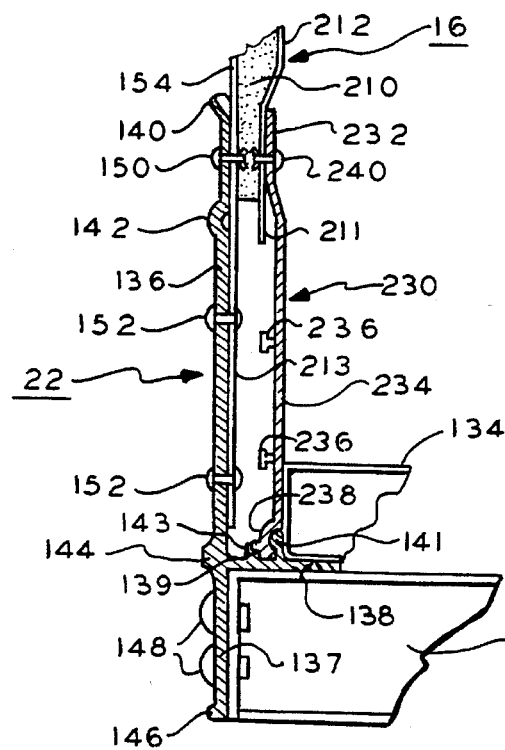

In FIG. 7*a*, representative lower rail 22 is an extruded aluminum member and includes a vertical leg 136 and a horizontal leg 138 extending from leg 136 close to the lower edge of leg 136, e.g., about 2.25 inches in this embodiment, where leg 136 has an overall height of about 9.250 inches. Leg 138 extends from leg 136 about 1.75 inches in this embodiment. A plurality of outwardly extending ribs 140, 142, 144 and 146 extend from leg 136. Ribs 144 and 146 protect from external damage rivets 148 securing beams 132 to leg 136 and ribs 140–144 protect from damage rivets 150 securing panel 16 to leg 136 and rivets 152 securing the panel 16 outer skin 213 to leg 136. A tortuous groove 139 is formed by upstanding projections 141 and 143 extending along the length of the rail.

In FIG. 10, rear section 88 comprises rear castings 44, rear rails 42 and 42', fitments 50 and an array of inverted hat shaped beams 160, 162, 164 and sill 55. The beams 160–164 and sill 55 have different depths to provide a sloping deck 168. (FIGS. 11 and 12).

In FIG. 9*a*, typical front corner post 28 comprises sheet steel stamped to the shape shown including an outer member 163 and an inner L-shaped member 165 having legs 167 and 169. The outer member 163 is generally L-shaped and includes a channel member 170 formed at one end having a bent overhanging leg 172 parallel to front wall 174. Member 163 includes an inclined wall 176 relative to normal walls 174 and 178. A pair of stepped legs 180 and 182 extend from wall 178. Leg 167 is coplanar with leg 172 and abuts plywood liner 64. Leg 172 abuts and is fastened to liner 64.

Front end panel 26 includes a thermoset rigid foam plastic core 184 sandwiched between inner skin layer 186 and outer skin layer 188. Core 184 preferably is about 0.82 inches thick with aluminum skin layers of about 0.04 inches thick to provide an overall panel thickness of about 0.90 inches. This thickness is typical for all of the side panels, front, central and rear. No prior art insulated container has such thin foam core insulated walls. The skin layers may in certain implementation be as thick as 0.063 inches. The 0.82 inch minimum thickness is critical, however, for maximizing panel strength and minimizing panel weight and cost.

Core 184 terminates at edge 190 spaced from leg 192 of post 28, leg 192 connecting legs 180 and 182. The inner skin layer 186 has an edge 195 on extension 191 which edge is a distance from core edge 190 less than edge 194 of outer layer 188 extension 193. Extension 191 may extend from core 184 about 3 inches and extension 193 about 5 inches. The extension 191 is riveted to leg 182 and extension 193 is riveted to leg 180. Leg 192 may have a tranverse width less than the thickness of the core 184. The skin 60 of the front wall assembly 56 is riveted to post 28 member 163.

In FIG. 9b, representative intermediate post 18 includes a U-shaped channel 196 having legs 198. Legs 198 at their edges are welded to plate 200 which have a total combined thickness to preferably of about less than 2 inches. A flange 202 is welded to each of legs 198 overlying plate 200 at its edges to form respective channels 204. One channel 204 receives end 206 of panel 26 which has a reduced thickness. The other channel 204 receives end 208 of panel 16 which end also has a reduced thickness, both panel ends being closely received between plate 200 and flanges 202. Panel 16 has an aluminum outer skin layer 154 and an inner aluminum skin layer 212 and a rigid thermoset foam plastic core 210. Layers 154 and 212 and core 218 are identical in thickness as front panel 26 and rear panel 36. Panels 16 and 26 reduced thicknesses at respective ends 206 and 208 are formed by reducing the core thickness on one side only and bending the inner skin layers during molding accordingly. The other side of the panels are planar. The other intermediate post 20 at the rear is attached to the central panel 16 in the same way as post 18, posts 18 and 20 being identical and the panel 16 end attached thereto being identical to end 208.

In FIG. 9c, rear panel 36 is similar to front end panel 26 and is connected to rear intermediate post 20 with the same construction that the front end panel 26 is connected to front intermediate post 18. The rear corner post 38 comprises two bent stamped steel sheet members 214 and 216 welded to form a tubular member wherein member 216 has an edge region forming a flange 218. A second flange 220 is welded to member 214 parallel to flange 218 for securing panel 36 thereto. Panel 36 is formed from an inner aluminum skin layer 222 and an outer aluminum skin layer 224 sandwiching a thermoset foam plastic rigid core 226 therebetween forming the 0.90 inch over all thickness described above. The end region 228 of panel 226 is similar to the end region of panel 26 at the container front, the panels 26, 16 and 36 all comprising the same materials. Panel 36 end region inner skin layer extension 223 extends about 3 inches from core 226 while outer skin extension layer 225 extends about 4 inches in this embodiment. These extensions are riveted to respective flanges 218 and 220 of rear post 214 which flanges are spaced apart a smaller distance than the overall thickness of panel 36.

Preferably the panels 16, 26 and 36 are formed simultaneously as one large panel and then later cut into three panels, 16, 26 and 36. A single panel is formed having a core and inner and outer skins layers. The inner and outer skin layers are of the same material as is the common foam core. The panel has recesses of identical dimensions formed therein forming the reduced thickness ends such as 206 and 208, FIG. 9b. The recesses are preferably about 0.15 inches deep and are rectangular in plan view with sloping inclined sides extending along the panel width which preferably is about 9 feet. The single panel length in this example is about 48 feet prior to cutting. This construction is similar to the roof panel construction illustrated in FIG. 14 to be described below. It is less costly to make one large panel and cut it than to fabricate three separate panels from liquid foam material with separate skins and molds. The reduced thickness regions are formed in the molded single panel which is then cut into the three panels forming a side. Thus the central panel and end panels have flush edges where attached to the intermediate posts.

The skin layers are preferably formed from coiled sheet aluminum with an epoxy coating which enhances adherence of the foam core thereto during core molding. The coil is preferably 49 inches wide as commercially available. The coil sheet material is formed into rectangular sections of the desired panel width, (floor to roof dimension) e.g., 107 inches for the outer skin layer and 101 inches for the inner skin layer. These rectangular sections are then riveted to one another in overlapping relation along the length dimension edges (107 inch dimension) of the skin layers, which in the finished panels is the panel width dimension. The sections are riveted until the finished panel length of nominally 48 feet is developed with a nominal 9 foot width. The skin layers are then placed in a mold in a commercially available press machine modified to accommodate the involved temperatures, pressures and panel dimensions. Such machines are available from manufacturers which fabricate the machine to specific design criteria for a given implementation. Liquid thermosetting foam is then injected into the mold between the skin layers with one or more, but preferably two injection nozzles for a 48-foot panel.

The foam is injected at a compromise pressure, temperature and viscosity adapted for the area of the skin layers and the relatively narrow spacing therebetween, e.g., 0.82 inches. The setting of the pressure, temperature and viscosity used are within the range of parameters of commercially available thermosetting foam material and are within the skill of one of ordinary skill in this art. The importance of these parameters is such that voids and breaks are to be avoided and uniformity of the core throughout is required. Such thin panels are significantly thinner than the 2 inch thick prior art panels used in refrigeration panels of containers and trailers. The foam core preferably is polyurethane foam of relatively high density of about 7.2 pounds per cubic foot but may lie in the range of about 4 to 9 pounds per cubic foot in accordance with a given implementation. Such foam cores typically are relatively rigid and heavy as compared to the skin layers. Therefore, the thinner the core, the lighter.

However, the panel must have a minimum strength in order to withstand typical loads induced by an interior cargo. The frame intermediate posts 18, 18' and 20, 20' and corner posts 28, 28' and 38, 38' normally carry vertical loads imposed by other upper containers or bending loads imposed by the internal cargo. The wall panels, however, share the stack load with the frame and carry all of the transverse cargo load in regions remote from the vertical posts. Also the wall panels may carry vertical loads if the container is stored on uneven ground for storage or if the container is lifted at its bottom edges by lifting devices. Thus load bearing capability is required of a container wall panel.

The walls must withstand loads imposed by cargos which lean or push against the walls and would otherwise cause the walls to bulge, such as loose cargo including carpet rolls and the like. The walls have to support such stresses and must be stiff and resistant to resultant deflections. Such deflections cause undesirable bulging of the container walls causing the container to be wider than designed and is unsightly. Such bulging also is not acceptable for rail cars which do not accommodate containers which bulge far beyond their nominal width. The resulting skin layer thicknesses and foam core thickness of the panels of the present invention represent a compromise of strength, rigidity and weight to achieve a relatively light weight panel that has a superior strength to weight ratio as compared to prior art panels.

FIG. 15 illustrates a typical side panel section for each of the panels 16, 26 and 36, panel 26 illustrated being representative. Inner skin layer 186 extends beyond the core 184 vertically at extensions 186'. The outer skin layer extends beyond the core 184 a greater distance than extensions 186' to form extensions 188'. The inner skin layer has an extension of about 0.5 inches whereas the outer skin layer has extensions of about 3 inches beyond the core layer. These extensions for connection to the upper and lower rails are typical for all of the side panels.

In FIG. 7a, representative panel 16 is connected to lower central rail 22 by riveting outer lower extension 213 of outer skin layer 154 to leg 136 with rivets 152. A blind rivet 150 secures leg 136 to the layer 154 and core 210. An extruded aluminum closure member 230 comprises a leg 232 non-planar with the remainder of member 230 plate 234. A pair of reinforcing ribs 236 upstand from plate 234. A hook 238 mates with groove 139 and is interlocked therewith in releasable fashion. Closure member 230 permits the rivets 152 to be accessed by a riveting tool (not shown). After the rivets 152 are secured the closure member 230 is secured in place and riveted at rivet 240 to panel 16.

Figure 8A:
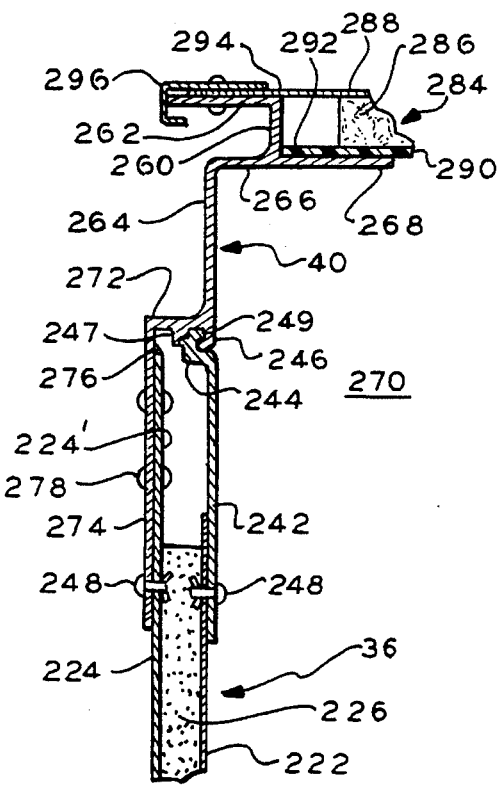

In FIG. 8a, representative extruded aluminum upper rail 40 comprises an elongated U-shaped channel member 260 having an upper flange 262 extending outwardly over vertical leg 264 depending from lower flange 266. Lower flange 266 has an inwardly extending extension 268. The terms inward and outward are relative to the container interior at 270. A flange 272 extends outward from the lower edge of leg 264. A pair of ribs 246 and 247 depend from flange 272 forming a tortuous groove 249. A vertical leg 274 depends from flange 272. A stop 276 extends inwardly from leg 274 to receive an abutting edge of outer skin layer 224 of extension 224' of panel 36. The panel 36 at the core region is riveted to leg 274 with blind rivet 248. The skin extension 224' is riveted with rivets 278 to leg 274.

At the time of riveting of the outer skin layer 224', aluminum extruded closure member 242 is not attached. After riveting the skin layer 224', closure member 242 is then attached to rail 40 and panel 36. Closure member 242 is representative and is interlocked to upper rear rail 40 by hook 244 mated in groove 249 of rail 40. Member 242 otherwise is a planar sheet member which is riveted to panel 36 over skin layer 222 by rivet 248. The closure member 242 is attached to the rail 40 after the panel 36 is riveted to depending leg 274 of rail 40 similarly to attaching the panel 16, FIG. 7a to lower rail 22. All of the side panels including the central and end panels are similarly attached to their corresponding upper rails as end panel 36 to upper rear rail 40, all upper rails being configured similarly as rail 40. The significant difference is that the front and rear lower rails are steel whereas all of the upper rails and the lower central rail are extruded aluminum.

In FIGS. 4 and 8, lower steel plate closure members 252 and 254, respectively, are attached to the inner skin layers and cores of respective front end panel 26 and rear end panel 36 by welding to the lower rails 34 and 42.

Figure 6:
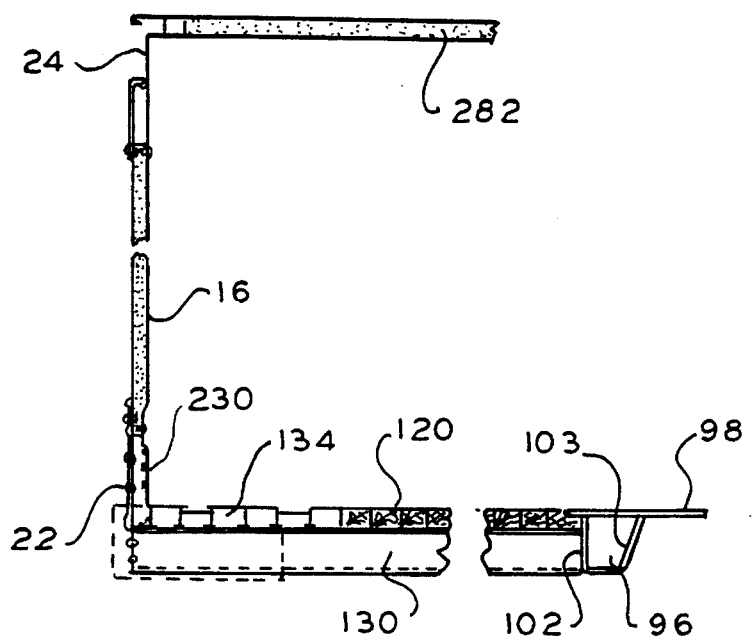
FIG. 6 is a sectional elevation view of the container of FIG. 1 taken along lines 6—6.

In FIG. 4, roof panel 280 is attached to and between upper front side rails 32 and 32', only rail 32 being illustrated. In FIGS. 5a, 6, 7 roof panel 282 is attached to upper central rails 24 and 24' on opposite container sides, only one side being illustrated. In FIG. 8, roof panel 284 is attached to upper rear rails 40 and 40' on opposite container sides, only one side being shown. In FIG. 8a, representative attachment of roof panel 284 to rail 40 is illustrated, all of the roof panels being connected to the upper side rails in similar fashion.

In FIG. 8a, panel 284 comprises a thermoset plastic foam rigid core 286 and upper and lower skin layers 288 and 290, respectively. Upper layer is sheet aluminum, preferably 0.040 inches thick and lower layer 290 is a thermoset fiberglass reinforced plastic sheet preferably 0.080 inches thick. The lower skin layer has an extension 292 which extends beyond the foam core 286 about 0.50 inches. The upper skin layer has an extension 294 which extends beyond the core 286 preferably about 2.25 inches. The core 286 preferably has a thickness of about 1 inch in its central region. At the edge regions at each of the side rails such as in FIG. 8a, however, the panel preferably has a reduced thickness to about 0.97 inches from the top of upper skin layer 288 to the bottom of lower skin layer 290.

The edge of core 286 and extension 292 rest on rail extension 268 and upper skin layer extension 194 extends over and on rail 40 flange 262. A sheet metal cover 296 covers the edges of the flange 262 and skin layer 294. Cover 296 and extension 294 are riveted to flange 262. This construction is typical for all of the upper rails.

In FIGS. 11 and 12, intermediate header 300 is connected to and between intermediate posts 18, 18' and castings 46. A second like header 302 is connected to and between posts 20, 20' and corresponding castings 46. Front header 51, FIG. 3a, is identical in cross-section to upper aluminum side rail 32, FIG. 4, at the roof of the container. The front header 51 is connected between and to front corner posts 28, 28' and upper rails 32 and 32'. The roof panel 280 is connected to front header 51 in a manner similar to the panel connection to rail 32, FIG. 4. These connections are similar to that illustrated in FIG. 8a for the panel 284 connection to rail 40, which is representative. The rear header 54, FIGS. 1 and 3a, is connected to and between rear corner posts 38, 38' and upper rear rails 40 and 40'.

In FIG. 16, representative intermediate header 300 comprises a sheet steel member 301 formed with a channel portion 304 having a base wall 305 and which extends for the length of the header. A pair of like mirror image channelized extensions 306 and 306' extend from each respective side of portion 304 at an edge of depending legs 308 and 310, respectively. Representative extension 306 includes a base wall 307 extending from an edge of leg 308, an upstanding leg 312 and an inwardly extending flange 314. A centrally located U-shaped channel member 316 is welded to the underside of the central base wall 305 for the length of the header. A plate 318 is welded to channel portion 304 at the junction of wall 307 and leg 308 and to member 316 coplanar with the member 316 base wall. An identical plate 318' is welded to the member 316 on its opposite side and to portion 304 in an identical fashion. A steel roof panel support plate 317, FIG. 17, is welded to base wall 307.

Composite roof panel 280 is secured to extension 306 and roof panel 282 is secured to extension 306', FIG. 17. Roof panel 280 core 319 of foamed thermoset rigid plastic is sandwiched between upper metal skin layer 320, preferably 0.040 inches thick aluminum sheet, and lower skin layer 322 formed of fiberglass reinforced fiberglass thermoset plastic (FRP), preferably 0.080 inches thick. The foam core is preferably 1 inch thick. The panel 280, which is at the container front, has an edge 324 which is flush with the skin layers and core. The skin layer 322 and core 319 are recessed at 326 to receive the plate 317 which supports the panel in the recessed region. This recess, like the recesses in the side panels, permits a thinner header or post construction for a given panel thickness. This contributes to reducing the weight of the container and provides for a substantially co-planar, cargo non-snagging interior roof surface formed by plate 317, wall 307 and skin layer 322. The central panel 282 is connected to the headers 300 and 302 in an identical construction as panel 280 to header 300. The rear roof panel 284 is also connected to rear intermediate header 302 and rear header 54 in a similar construction.

In FIG. 17, a cover 330 similar to cover 296, FIG. 8a, comprises a plate 332 and a U-shaped channel portion extending from plate 332. Channel portion 334 covers the end of leg 314 of header 300. The plate 332 is riveted to the panel 280. Sealant 334, 336 and sealant tapes not shown are between the header and the panel.

In FIG. 17a, an alternate embodiment for attaching a panel to a header is shown wherein a connecting member 338 connects panel 280 to header 300. The connecting member 338 comprises a relatively thicker flat plate 340 from which depends leg 342. A panel support flange 344 extends from the lower edge of leg 342. The plate 340 is riveted over header leg 314 and to the panel 280 by respective rivets 346 and 348 with cover 330 over plate 340. Flange 344 is riveted to panel 280 by rivet 350. Panel 280 is thus supported by member 338.

In FIGS. 13 and 14, roof composite panel 352 comprises a single panel having panel sections 280', 282' and 284' from which respective panels such as panels 280, 282 and 284 are formed. The roof panel 352 is formed of a plurality of rectangular skin layer sections similar to that described for the side panels. For example, sections 354 are representative. The sections in this embodiment comprise skin layers preferably 49 inches wide (the panel length direction from left to right in the Figure) by about 100 inches in length from the edge of the skin extensions 356 of the upper outer aluminum sheet metal skin layer 358. The lower inner skin thermoset FRP layer 359 has a width of about 97 inches including extensions 360. Lines 361 show the edges of the different sections 354.

The core 362 is molded foam rigid thermoset plastic of similar, but lower density composition as the side panels. The skin sections are riveted together in overlapping relation along the section lengths (panel width) at lines 361. The two skin layers are then placed in a mold inside a press machine and foam injected with one or more, but preferably two injection nozzles at about the same pressure, temperature and viscosity as the side panel core. The press machine is used in a manner known in this art. Here the core is about 1 inch thick as compared to the 0.82 inch thickness of the side panels. The density is lower than that of the side panels and preferably is about 6 pounds per cubic foot because of the lower strength requirements for the roof panel.

During molding the exterior upper surface of the panel is formed with an array of rectangular recesses 364 and 364'. Representative recess 364', FIG. 14, comprises a base 366 and inclined walls 368 with a total base flat width w of preferably about 2 inches and a depth of about 0.15 inches to form a corrugated surface on the panel, the FIG. 14 arrangement not being to scale. The underside of the roof panel is formed with recesses 370 and 372 along the panel width. In FIGS. 13 and 14 the panel after the core is cured and rigid, is cut along lines 374 and 376 to form end panels 280 and 284 and central panel 282. The front panel 280 is planar on the upper surface while the rear panel is recessed at its edges (not shown in FIG. 14). The recesses 364 allow for thermal expansion and contraction variations and add to the roof rigidity. The recesses 370 lie at the edges of the panels for connection to the corresponding headers as shown for example in FIG. 17. The riveted skin sections 354 of the side and roof panels permits easy repair of damaged portions by removal of the appropriate rivets and replacement with a new section. Such repair is difficult when the skins are integral continuous layers.

In FIG. 18, the rear header 54 includes a sheet metal formed plate member 380 having a recessed channel extension 382 extending from one edge thereof, the other edge has a depending flange 384. An inverted U-shaped channel member 386 is welded to the underside of the member 380. The extension 382 is the same in construction as extension 306 of intermediate header 300, FIG. 16. A plate 390 is welded to extension 382 for supporting a roof panel thereon in a manner similar to the connection to an intermediate header illustrated in FIG. 16. The end panels 280 and 284 are secured to respective rear and front headers 54 and 51 in a similar manner as attached to the intermediate headers 300. Appropriate sealants are used at the panel interfaces with the headers.

Figure 19:
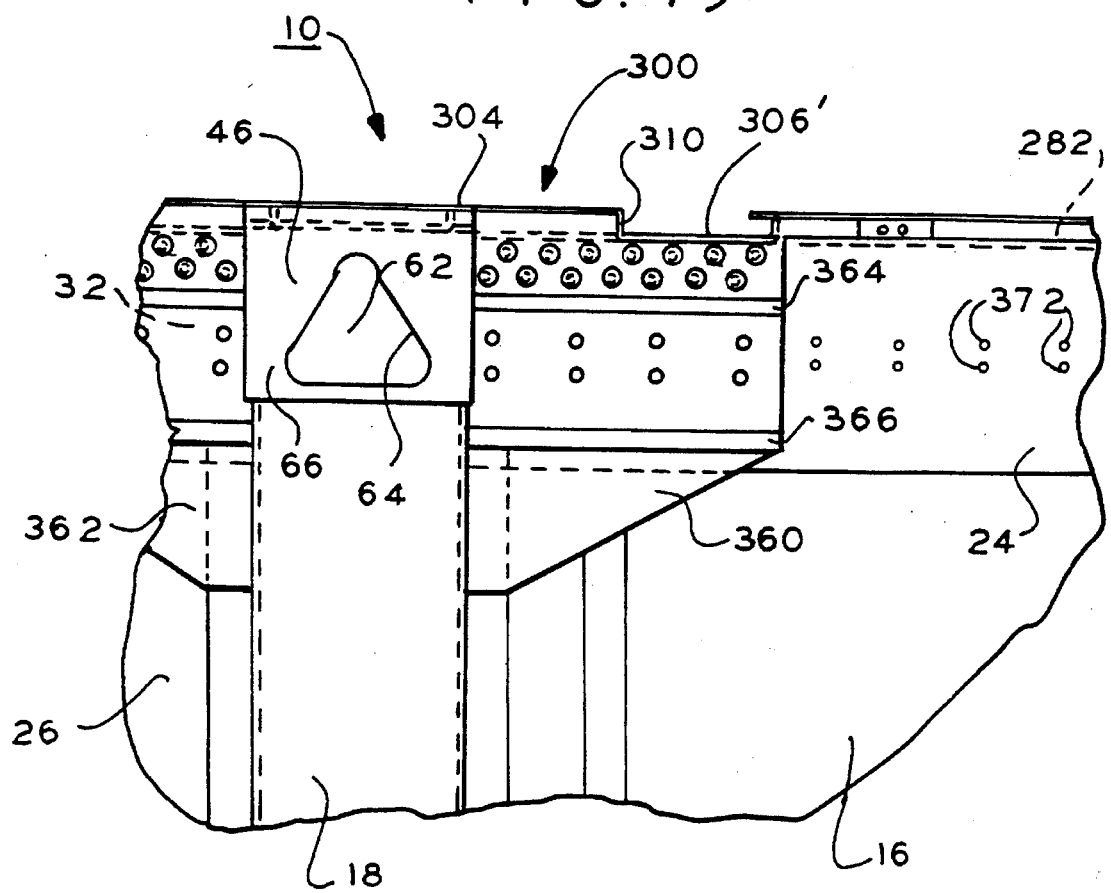
FIG. 19 is a side elevation fragmented view of region 19 of FIG. 1.

In FIG. 19, a pair of gussets 360 and 362 are attached to the upper end of post 18, casting 46 and upper central rail 24 and upper front rail 32. Gussets 360 and 362 are welded to the post 18 and casting 46. The gusset 360 is a mirror image of gusset 362 and is representative. Gusset 360 includes a pair of spaced ridges 364 and 366. See also FIG. 5a. Rivets 368 attach the gusset 360 to rail 24. Rivets 370 attach the gusset 360 to the vertical depending leg of rail 24 and the upper outer skin extension such as extension 188' (FIG. 15) of panel 16. These rivets correspond somewhat to rivets 372 which attach the Panel 16 upper skin extension to the rail 24 in the remainder portion thereof.

As seen in FIG. 5a, the ridges 364 and 366 extend beyond the rivet heads of rivets 370 protecting these rivets from damage as the container is transported and lifted in use, especially in and out of rail car wells which tend to rub against the container sides. Similarly, as seen in FIG. 7a, rivets 148 are protected by ridges 144 and 146 and ridges 140, 142 and 144 protect rivets 150 and 152. As a result, the rivets and container are not readily subject to damage and have a longer life.

A contribution to the lighter weight of the container is that beam 130, FIG. 10, is shorter in height than prior art beams, the vertical legs 136 of the lower rails 22, FIG. 7a, have a shorter depending leg 137 below leg 138 than prior systems, e.g., 2.25 inches as compared to 4 inches. Also, in FIG. 8a, the upper rails such as rail 40 has a leg 260 which is shorter than prior rails, e.g., 0.883 inches as compared to 1 inch. While these differences appear small, they are significant in reducing the overall weight of the container while increasing its interior volume and are a compromise of strength, dimensions and weight. For example, a container constructed as described herein has an overall weight of 8900 pounds for a 48 foot container which is the same weight of a conventional all metal skin container without the composite heavier foam core. This is a significant weight reduction. The roof panels have no additional beams other than the headers. The recesses in the roof panels add to the rigidity of these panels. Also, the rivets joining the skin layer sections are within the roof panel recesses protecting these rivets further.

While in this embodiment a 48 by 9 foot nominal dimensioned container has been described, it should be apparent that modifications may be made within the scope of the present invention. For example, the container may be in the range of approximately 15 to 55 feet in length to accommodate different size implementations. Some containers may be as short as 15 feet without end panels for example. Other containers may be longer with end panels. Also, some containers may be only single ended, i.e., only one end has end panels rather than a double end frame as the container described herein. Panels made of thin rigid thermoset foam cores, e.g., in the range of about 0.75 to 1.5 inches with thin aluminum and/or plastic skins as described herein for use in over the road chassis highway implementations and for rail car use are contemplated to be within the scope of the present invention.

Surprisingly, the thin panels provide support for expected cargo loads without significant bowing or other detrimental deflections while simultaneously providing reduced weight. Also, the closure members cosmetically improve the appearance of the panels while permitting attachment of the outer skins to the upper and lower rails, the closure members being of extruded aluminum are relatively light weight. Also, by reducing the floor and roof beam heights, the weight of the container is further reduced and the interior dimensions increased. The hollow castings also contribute to a lighter container.

The upper and lower rails act as flanges and the vertical side panels act as webs as in a typical I beam configuration. The web of a beam contributes minimally to its bending stiffness, therefore, by reducing the web weight of a beam, a beam is formed with a maximum strength/stiffness to weight ratio. By minimizing the appropriate dimensions, the strength of such an I beam is enhanced while minimizing weight. Also, the intermediate posts have a minimum thickness by aligning the stresses of an upper container close to the posts which minimizes transverse bending loads on the posts due to torques induced by the upper stacked containers. Thus a container for use over the road and for rail cars can have a maximum payload without detracting from the container strength.

What is claimed is:

1. A cargo container including a floor, a roof and a plurality of side walls and end walls coupled together, the combination therewith comprising:
   said roof comprising:
   a planar core sheet of rigid thermoset foam;
   an external sheet skin layer; and
   an internal sheet skin layer, said foam sheet being adheringly attached to and between the skin layers to form the container roof;
   said roof having a plurality of recesses in said external layer and the core next adjacent to the external layer to allow for thermal expansion in response to thermal cycling.

2. In a lightweight cargo container including a floor, a roof, and a plurality of side walls and end walls coupled together, the combination therewith comprising:
   said roof comprising:
   a planar core sheet of rigid thermoset foam;
   an external metal skin layer; and
   an internal plastic sheet skin layer, said foam sheet being adheringly attached to and between the skin layers to form said container roof, said roof having a thickness of less than 1.5 inches, a length of 15 to 40 feet and a width of about 9 feet;
   said roof having plurality of transverse recesses in said external layer and the core next adjacent to the external layer, and including rivets located in said recesses.

3. In the container of claim 2 wherein the skin layers are formed of rectangular sections extending transverse the length and rivets for securing the sections to each other along said 9 foot dimension.

4. In the container of claim 2 wherein the container side walls are on opposite container sides, said side walls each forming a side wall panel, said side wall panels comprising external and internal metal skin layers and a rigid thermoset foam core, said side wall panel skin layers and core having a combined thickness in the range of 0.750 to 1.00 inches.

5. In the container of claim 4 wherein the side wall panels and roof have about the same length.

6. In the container of claim 5 wherein the roof and side wall panels have a foam core width dimension less than that of the corresponding skin layers.

7. In the container of claim 6 wherein the internal skin layers have a width dimension less than the external skin layers.

8. Thermally insulated cargo container comprising:
   a floor;
   a roof overlying the floor;
   a plurality of side walls secured to the roof and floor and forming a cargo receiving space therebetween, one of said walls forming a front wall and a pair of said walls forming opposing sides of said container, each said opposing sides and roof comprising:
   a first sheet skin layer;
   a second sheet skin layer spaced from and substantially parallel to the first layer; and
   a thermoset foam core thermally insulating layer secured to and between the first and second skin layers;
   said roof having a plurality of recesses in said core and in one of said sheet skin layers arranged to allow for thermal expansion of said roof in response to thermal cycling.

9. Thermally insulated cargo container comprising:
   a floor;
   a roof overlying the floor;
   a plurality of side walls secured to the roof and floor and forming a cargo receiving space therebetween, one of said walls forming a front wall and a pair of said walls forming opposing sides of said container, each said opposing sides and roof comprising:
   a first sheet skin layer;
   a second sheet skin layer spaced from and substantially parallel to the first layer; and
   a foam core thermally insulating layer secured to and between the first and second skin layers; each said opposing sides including a pair of spaced posts connected between the floor and the roof, the container including an upper rail connected to and between said posts on each side at said roof and a lower rail connected to and between said posts on each side at said floor, the first skin layer being external the container and the second skin layer being internal the container, each said rails including an outer leg extending therefrom for securing said first skin layer thereto and first interlock means internal said outer leg, said container further including a closure member having second interlock means engaged with and interlocked to said first interlock means and means securing the second internal skin layer to said closure member.

10. Thermally insulated cargo container comprising:
    a floor;
    a roof overlying the floor;
    a plurality of side walls secured to the roof and floor and forming a cargo receiving space therebetween, one of said walls forming a front wall and a pair of said walls forming opposing sides of said container, each said opposing sides and roof comprising:
    a first sheet metal skin layer;
    a second sheet skin layer spaced from and substantially parallel to the first layer; and
    a thermoset foam core thermally insulating layer secured to and between the first and second skin layers, said first, second and insulating layers having a combined thickness of at most about 1.5 inches and a broad surface region of at least about 15 feet in length by about 9 feet in width;

one of said skin layers of the roof is external the container cargo receiving space and comprising sheet metal and the other skin layer is internal and comprises a fiber glass reinforced plastic (FRP) sheet;

the sheet metal skin layer comprises aluminum, said roof further having a plurality parallel recesses in said core and in said sheet metal skin arranged to allow for thermal expansion of said roof in response to thermal cycling.

11. The container of claim 10 wherein the skin layers each comprise a plurality of rectangular sections having a length and width, the sections being attached to one another at a length edge thereof in overlapping relation.

12. The container of claim 11 wherein the sections are about 49 inches wide and 90 to 110 inches long, the opposing sides and roof each has a length in the range of 15 to 55 feet wherein the length dimension of the sections is normal to the length of said opposing sides and roof.

13. The container of claim 10 wherein the skin layers each comprise a plurality of parallel rectangular sections, each section having a length of about 9 feet and a width of about 4 feet, each section being riveted to a next adjacent section along the length dimension of the sections.

14. The container of claim 10 wherein the foam core layers are each formed of rigid thermoset foam having a density in the range of about 4 to 9 pounds per cubic foot.

15. The container of claim 10 wherein the roof is rectangular having a longitudinal dimension, said recesses being rectangular and transverse said longitudinal dimension.

16. The container of claim 15 wherein the skin layers and core are in rectangular sections in the roof and opposing sides, adjacent ones of said sections being riveted to one another, the rivets in said roof sections being at a joint region located in and extending along each recess.

17. The container of claim 10 wherein each said core layer has two sets of opposing edges, the skin layers at at least one of said sets of edges extending different distances beyond the core layer edges.

18. The container of claim 10 wherein the core layer has a density of about 7 pounds per cubic foot.

19. The container of claim 17 wherein said roof and opposing sides each comprise a central panel having flush skin and core layers at a first set of opposing edges and the other set of edges has said skin layers of different distances, each said opposing sides comprising first and second intermediate posts connected between and to said floor and roof and to said flush opposing edges of the central panel, each said roof and opposing sides comprising first and second end panels wherein the skin layers and core layer are flush at one of said sets of edges in each end panel and extending different distances from the core layer at the other of said sets of edges in each end panel, said flush edges of the end panels of the sides each being connected to a different intermediate post on one of said opposing sides and each said opposing sides further including a front post and a rear post connected to and between said roof and floor, the other of said sets of edges of the end panels being connected to a different corresponding one of said front and rear posts.

20. Thermally insulated cargo container comprising:
a floor;
a roof overlying the floor;
a plurality of side walls secured to the roof and floor and forming a cargo receiving space therebetween, one of said walls forming a front wall and a pair of said walls forming opposing sides of said container each said opposing sides and roof comprising:
a first sheet metal skin layer;
a second sheet skin layer spaced from and substantially parallel to the first layer; and
a thermoset foam core thermally insulating layer secured to and between the first and second skin layers, said first, second and insulating having a combined thickness of at most about 1.5 inches and a broad surface region of at least about 15 feet in length by about 9 feet in width,
each said opposing sides includes a pair of spaced posts connected between the floor and the roof, the container including an upper rail connected to and between said posts on each side at said roof and a lower rail connected to and between said posts on each side at said floor, the first skin layer being external the container and the second skin layer being internal the container, each said rails including an outer leg extending therefrom for securing said first skin layer thereto and first interlock means internal said outer leg, said container further including a closure member having second interlock means engaged with and interlocked to said first interlock means and means securing the second internal skin layer to said closure member.

21. The container of claim 20 including upper front and rear headers connected respectively to and between the front and rear posts, the roof end panels being connected to and between respective corresponding front, rear and first and second intermediate headers.

22. A lightweight thermally insulated cargo container including a floor, a roof and plurality of side walls coupled together, the combination therewith comprising:
a frame having a front, a rear and opposing sides comprising:
at least one lower rail on each of opposing frame sides;
at least one upper rail corresponding to and aligned over the lower rail on said opposing sides;
first and second spaced intermediate posts coupled to the at least one lower and upper rails on each said sides;
a pair of front and rear corner posts coupled to said lower and upper rails at said front and rear respectively;
a lower front sill coupled between the front posts;
a lower rear sill coupled between the rear posts;
a plurality of headers, each coupled to each frame side at an upper region between said intermediate, front and rear posts;
a composite central panel connected between and to said at least one lower and upper rails and said first and second intermediate posts on each side;
a first composite end panel connected between and to said at least one lower and upper rails and a front and first intermediate post on each said sides;
a second composite end panel connected between and to said at least one lower land upper rails and a rear and a second intermediate post on each side;
said composite panels each comprising a rigid foam core and an inner and outer skin layer; and
a plurality of roof panels including a central panel and a pair of end panels coupled between different pairs of said headers, at least the central panel having a plurality of transverse recesses relative to the length of the container for responding to thermal expansion and contraction of said at least central roof panel.

23. The container of claim 22 wherein the combined thickness of the central panel is about 0.900 inches.

24. The container of claim 22 wherein the skin layers are aluminum sheets of about 0.040 inches thick and the foam core is about 0.750 inches thick.

25. The container of claim 22 including rivets for riveting the central and end panels to said at least one lower rail, said rivets including heads extending beyond said outer skin layers and rib means secured to said at least one lower rail and extending beyond said heads for enclosing said heads in a recessed space.

* * * * *